United States Patent [19]
Katayama et al.

[11] Patent Number: 5,617,460
[45] Date of Patent: Apr. 1, 1997

[54] METHOD OF INCREASING INDEX OF REFRACTION OF SILICA GLASS

[75] Inventors: Makoto Katayama; Tomohiko Kanie, both of Hyogo, Japan

[73] Assignee: Sumitomo Electric Industries, Ltd., Osaka, Japan

[21] Appl. No.: 542,791

[22] Filed: Oct. 13, 1995

[30] Foreign Application Priority Data

Oct. 17, 1994 [JP] Japan .................................. 6-250494
Sep. 26, 1995 [JP] Japan .................................. 7-247495

[51] Int. Cl.⁶ .................................................. G21K 5/00
[52] U.S. Cl. ................................................ 378/64; 385/123
[58] Field of Search ...................... 378/64, 34; 385/123, 385/124; 430/290, 967

[56] References Cited

U.S. PATENT DOCUMENTS 5,084,909  1/1992  Pollak .................................. 378/64

FOREIGN PATENT DOCUMENTS 0420592  4/1991  European Pat. Off. .
2808457  8/1979  Germany .
59-015203  1/1984  Japan .
6258674  9/1994  Japan .

OTHER PUBLICATIONS

Hoshakou (Synchrotron Radiation) vol. 7, No. 2 (1994) pp. 112–114.

*Primary Examiner*—Don Wong
*Attorney, Agent, or Firm*—W. G. Fasse; W. F. Fasse

[57] ABSTRACT

A method of increasing index of refraction of silica glass includes the step of irradiating a prescribed region of silica glass with X-ray having a wavelength within a range of from 1.2 Å to 7.0 Å, and exciting K shell electrons of silicon atoms in the irradiated region with the X-ray, so that the index of refraction in the irradiated region is increased efficiently.

15 Claims, 4 Drawing Sheets

METHOD OF INCREASING INDEX OF REFRACTION OF SILICA GLASS

BACKGROUND OF THE INVENTION

1. Field of the Invention

The present invention relates to a method of increasing an index of refraction of silica glass induced by radiation, which is applicable to a portion having high index of refraction required of an optical component such as an optical waveguide or a fiber optic diffraction grating.

2. Description of the Related Art

Presently, it is known that the index of refraction of silica glass can be increased by induction by radiation of light. Here, the term "light" is used to represent wide concept including not only visible light but also light of every wavelength.

In *HOSHAKOU (Synchrotron Radiation)* Vol. 7, No. 2 (1994) pp. 112–114, it is described that the index of refraction of silica glass can be increased by exciting valence electrons (electrons of the outermost shell) of silica glass by radiation. It is considered that the change in the index of refraction derives from distortion of atomic arrangement and lattice defect generated by radiation in silica glass.

FIG. 6 is a graph showing relation between wavelength of light and change in the index of refraction disclosed in Japanese Patent Laying-Open No. 6-258674. In this graph, the abscissa represents the light wavelength λ (nm) directed to the silica glass, and the ordinate represents an amount of change $\Delta n \times 10^3$ in the index of refraction of the irradiated silica glass. As can be seen from FIG. 6, it is found in Japanese Patent Laying-Open No. 6-258674 that remarkable change in the index of refraction is observed in silica glass when it is irradiated with light having the wavelength of about 150 nm.

Now, in order to obtain desired change in the index of refraction necessary for forming an optical part, light radiation for about several ten minutes are necessary even when light having the wavelength of about 150 nm which causes such a remarkable change in the index of refraction shown in FIG. 6 is used. Such a long period of time for irradiation presents a problem of inefficiency, in view of industrial processing.

As described in column 2, paragraph number [0013] of Japanese Patent Laying-Open No. 6-258674, the change in the index of refraction of silica glass is not very large when it is irradiated with light having the wavelength longer than 160 nm, but the thickness range in which the index of refraction changes becomes as large as several mm, which is considerably large. On the other hand, if the silica glass is irradiated with light having a wavelength shorter than 160 nm, the change in the index of refraction is large, but the range in thickness in which the index of refraction changes becomes as small as several nm at the surface. Therefore, it is difficult to precisely adjust the distribution of the change in index of refraction in the order of μm in the thickness direction of silica glass.

SUMMARY OF THE INVENTION

In view of the problem of the prior art, an object of the present invention is to provide a method of efficiently increasing the index of refraction of silica glass by radiation for a short period of time.

Another object of the present invention is to provide a method of precisely adjusting distribution of change in the index of refraction in the thickness direction of silica glass.

In the method of increasing index of refraction of silicon glass in accordance with one aspect of the present invention, a silica glass is preferred, a prescribed region of the silica glass is irradiated with X-ray having the wavelength within the range of from 1.2 Å to 7.0 Å, and K shell electrons of the silicon atoms in the irradiated region are excited by X-ray, whereby the index of refraction of the irradiation region is increased.

Since silica glass is irradiated with X-ray having the wavelength within the range of from 1.2 Å to 7.0 Å, K sell electrons of the silicon atoms in silica glass are efficiently excited by X-ray, and hence the index of refraction in the irradiated region can be increased in a short period of time.

According to the method of increasing index of refraction of silica glass in accordance with another aspect of the present invention, synchrotron radiation is used as the X-ray for irradiation.

Since synchrotron radiation is used as an X-ray, X-ray having high intensity is used for irradiation, and hence the index of refraction of silica glass can be increased efficiently in shorter time period.

According to the method of increasing index of refraction of silica glass in accordance with a further aspect of the present invention, silica glass is irradiated with X-ray which has transmitted through a metal film filter formed, for example, of a beryllium film.

Since a metal film filter formed of a beryllium film or the like is used, only the X-ray having such a wavelength that can efficiently excite K shell electrons of silicon atoms in silica glass can be extracted and directed to the silica glass. Therefore, the index of refraction of the silica glass can be increased within a short period of time, while preventing heating of silica glass caused by radiation with light having wavelength not much related to excitation.

In the method of increasing index of refraction of silica glass in accordance with a still another aspect of the present invention, X-ray having a desired wavelength which is obtained by a crystal spectrometer using a silicon crystal, for example, is directed to the silica glass. Since irradiation with X-ray having desired wavelength becomes possible by the use of a crystal spectrometer including a silicon crystal, for example, the index of refraction of silica glass can be increased efficiently is short period of time, while preventing heating of the silica glass caused by radiation with light having unnecessary wavelength.

According to the method of increasing index of refraction of silica glass in accordance with a still further aspect of the present invention, X-ray having a prescribed wavelength within the range of from 1.2 Å to 7.0 Å is selected, and silica glass is irradiated with the X-ray having the selected wavelength. Therefore, distribution of the index of refraction in the depth direction from the surface of the silica glass can be adjusted.

The influence in the change of wavelength of the X-ray within the range of from 1.2 Å to 7.0 Å on the thickness range in which the index of refraction changes is moderate as compared with the influence of the change in wavelength near 160 nm on the thickness range in which the index of refraction changes. Therefore, distribution in the change of index of refraction in the thickness direction can be adjusted more precisely.

According to another aspect of the present invention, silica glass is cooled while it is irradiated with X-ray.

As the silica glass is cooled while it is irradiated with X-ray and increase in temperature is prevented, the index of refraction can be efficiently changed while preventing thermal distortion or thermal deterioration of silica glass.

In the method of increasing index of refraction of silica glass in accordance with a still further aspect of the present invention, the amount of irradiation of X-ray necessary for causing desired amount of change in the index of refraction can be found by utilizing the relation that the amount of change in the index of refraction is in proportion to the nth power ($0<n<1$) of the amount of radiation of X-ray.

Therefore, the amount of radiation of X-ray necessary for obtaining desired amount of change in the index of refraction can be precisely set in advance.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
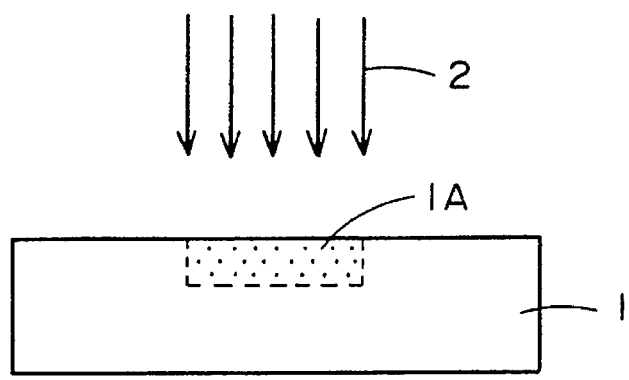
FIG. 1 is a schematic cross section showing the method of increasing index of refraction of silica glass in accordance with one embodiment of the present invention.

FIG. 1 is a schematic cross section showing the method of increasing index of refraction of silica glass in accordance with one embodiment of the present invention. First, according to known gas phase deposition, a synthesized silica glass 1 was prepared. Synchrotron radiation having peak wavelength of 5.4 Å was used as light 2 for radiation. The synchrotron radiation 2 was obtained by synchrotron radiation generating apparatus NIJI-III manufactured by Sumitomo Electric Industries, Ltd. The atmosphere for radiation was ultra high vacuum of $10^{-9}$ to $10^{-10}$ Torr, and distance between light source of synchrotron radiation and silica glass 1 was 1.6 m. In such a state, radiation was performed with 24 mA.h, where mA.h represents a product of stored current in the synchrotron and the time of radiation.

The amount of change $\Delta n$ in the index of refraction in the irradiated area 1A of synthesized silica glass 1 which has been radiated with light was measured by using Pulfrich refractometer. In this refractometer, the index of refraction was measured by using d line of He (having the wavelength $\lambda=587.6$ nm). As a result, the amount of change $\Delta n$ in the index of refraction at the irradiated area 1A was $1\times10^{-3}$. The condition of irradiation was equivalent to radiation for 3.4 sec when the distance between the light source of synchrotron radiation and silica glass 1 was set to 10 cm and stored current amount of synchrotron radiation generating apparatus NIJI-III was set to 100 mA.

Figure 6:
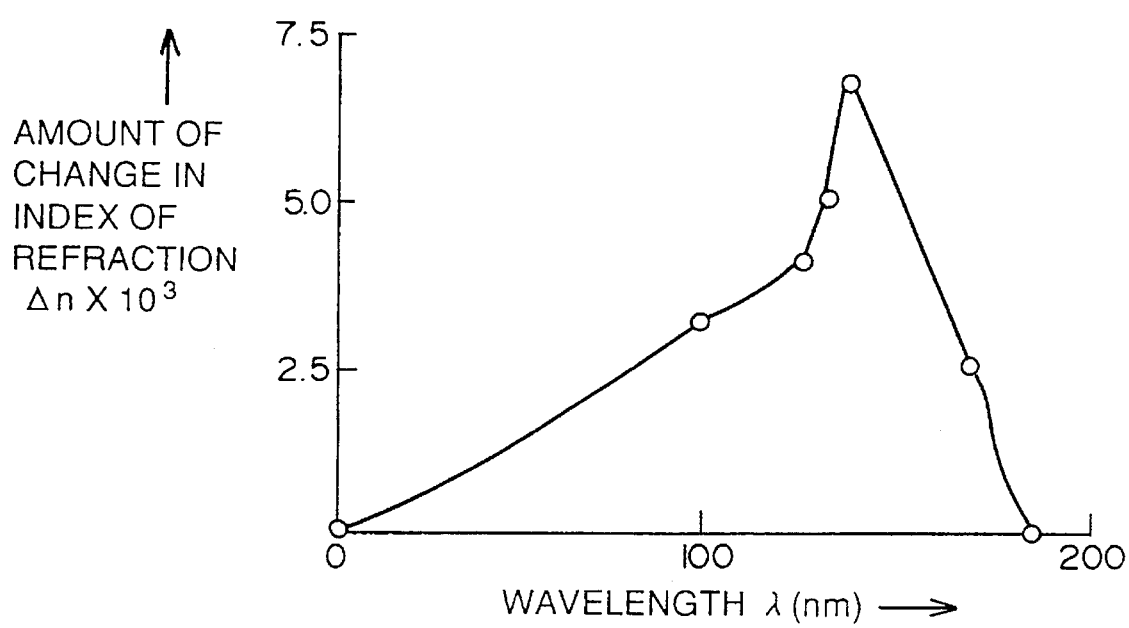
FIG. 6 is a graph showing relation between the amount of change index of refraction of silica glass and wavelength of the light for irradiation disclosed in Japanese Patent Laying-Open No. 6-258674.

More specifically, when the silica glass is irradiated with X-ray having the wavelength within the range of from 1.2 Å to 7.0 Å, K shell electrons, which are inner shell electrons of silicon atoms in silica glass are excited, structure of the silica glass changes and the index of refraction changes. The efficiency of change in the index of refraction caused by excitation of K shell electrons is extremely high. The amount of change in the index of refraction per irradiation of one photon is as high as about 300 times that described in the aforementioned article HOSHAKOU which is obtained by irradiation with the wavelength having highest efficiency in changing the index of refraction described with reference to FIG. 6. Therefore, the time necessary for causing a prescribed change in the index of refraction of silica glass by excitation of K shell electron can be remarkably reduced to about 1/300 as compared with the time necessary in the conventional method in which valence electrons are excited.

Figure 2:
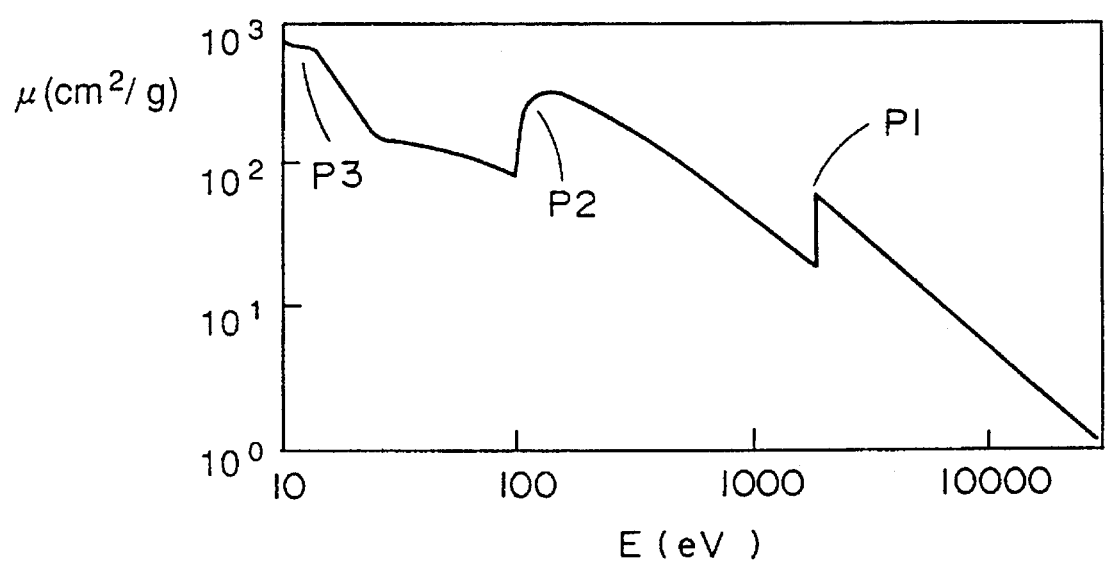
FIG. 2 is a graph showing relation between cross sectional area of light absorption of a silicon atom and energy of radiation.

FIG. 2 is a graph showing relation between cross sectional area of light absorption of a silicon atom and energy of radiation described in *Atomic Data and Nuclear Data Tables*, Vol. 54, 1993, pp. 181–342, published by ACADEMIC PRESS. In this graph, the abscissa represents optical energy E (eV) per one photon, and the ordinate represents cross sectional area $\mu$ ($cm^2/g$) of light absorption of silicon atom. It can be seen that as the cross sectional area $\mu$ of light absorption increases, the amount of light absorption by the electrons increases. The first, second and third peaks P1, P2 and P3 in the curve of the graph represent absorption peaks by the electrons in K, L and M shells of the silicon atoms, respectively. The M shell electrons of silicon correspond to valence electrons at the outermost shell.

The position of peak P1 of light absorption by the K shell electrons corresponds to the optical energy of 1.8389 keV, and the light having this energy has the wavelength of 6.743 Å (about 7Å). Namely, absorption of X-ray by the K shell electrons occur with respect to light having wavelength shorter than about 7 Å. The X-ray having the wavelength longer than 7 Å is absorbed by electrons of the L and M shells, and not absorbed by the electrons of K shell.

Now, as can be seen from FIG. 2, as the wavelength of X-ray becomes shorter, the amount of absorption by the electrons of each shell decreases monotonously. If the wavelength of the X-ray is 1.2 Å (which corresponds to E=10000 eV), the cross sectional area for absorption becomes about 1/100 as compared with the peak P1. In other words, if the light has wavelength shorter than 1.2 Å, light absorption by the K shell electrons of silicon hardly has any influence on the change in the index of refraction.

Therefore, in order to increase the index of refraction of silica glass, it is desirable to use X-ray having the wavelength within the range of from 7 Å to 1.2 Å in which absorption by K shell electrons of silicon atoms occur efficiently.

Similar experiment of light radiation was performed on K shell electrons of oxygen atoms in silica glass. However, significant change in the index of refraction could not be found. The reason may be the fact that even if there is a change in the index of refraction caused by light absorption by oxygen atoms, the change in the index of refraction is limited at the very surface of silica glass (to the depth of at most about 0.5 μm) and hence it could not be measured as significant result by the Pulfrich refractometer (Pulfrich refractometer requires the depth of about 1 μm for measuring the index of refraction). Light absorption energy limit by K shell electrons of oxygen atoms is about 540 eV, which corresponds to the light having the wavelength of about 23 Å.

Further, similar experiment of light absorption was performed on L shell electrons of silicon atoms. However, significant change in the index of refraction of silica glass could not be found.

Figure 3:
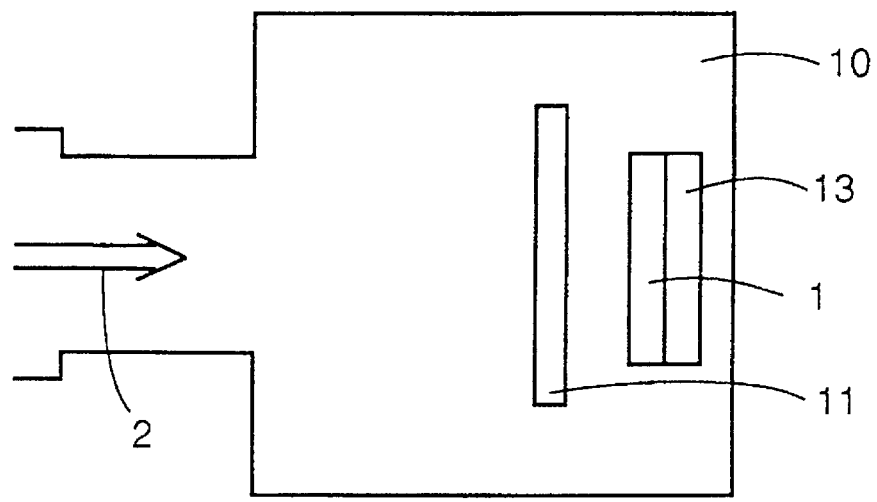
FIG. 3 is a schematic cross section showing the method of increasing index of refraction of silica glass in accordance with another embodiment of the present invention.

FIG. 3 is a schematic cross section showing a method of increasing index of refraction of silica glass in accordance with another embodiment of the present invention. In this embodiment, silica glass 1 is set in a radiation sample chamber 10. Synchrotron radiation 2 is directed to the silica glass 1 through a metal thin film filter 1 formed of beryllium having the thickness of 20 μm, for example. By the use of such metal thin film filter 11, the irradiation of sample 1 with infrared light which has far longer wavelength than the X-ray having longer wavelength than 12 Å, which is not much relevant to the change in the index of refraction of silica glass 1, can be suppressed to be 1/10 or less. Thus, increase in temperature of silica glass caused by irradiation with light having wavelength not contributing to the change in the index of refraction, and hence the index of refraction of silica glass can be increased efficiently while preventing thermal distortion and thermal deterioration of silica glass. When the change in the index of refraction was caused by using the filter formed of beryllium film mentioned above, the efficiency of the change in index of refraction was about 60% as compared when the filter is not used.

While the sample 1 is irradiated with X-ray in the example shown in FIG. 3, the sample may be cooled by a cooling apparatus 13. Cooling apparatus 13 uses a coolant such as a liquid nitrogen, so as to surely prevent increase in temperature of silica glass 1 caused by X-ray radiation. More specifically, use of a cooling apparatus 13 is preferred in order to surely prevent thermal distortion and thermal deterioration of silica glass while increasing the index of refraction of silica glass efficiently.

Figure 4:
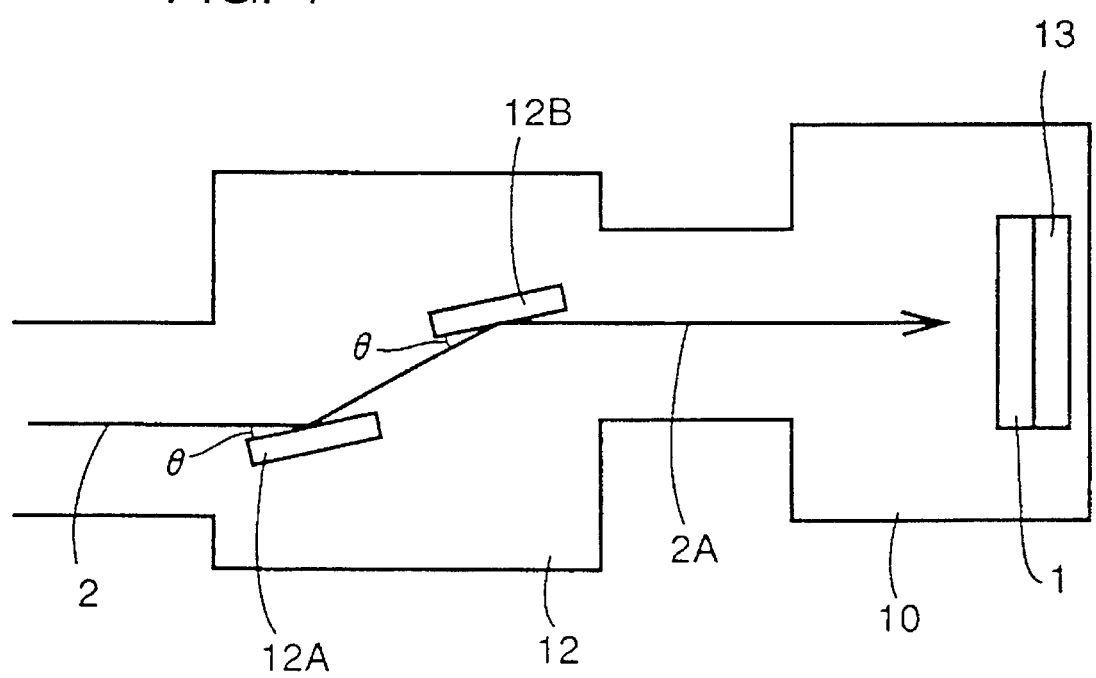
FIG. 4 is a schematic cross section showing the method of increasing index of refraction of silica glass in accordance with a still further embodiment of the present invention.

FIG. 4 is a schematic cross section showing a method of increasing index of refraction of silica glass in accordance with a still further embodiment of the present invention. In the embodiment of FIG. 4 also, silica glass is set in a light irradiation sample chamber 10. A crystal spectrometer 12 includes a first silicon single crystal 12A and a second silicon single crystal 12B. Preferably, silicon single crystals 12A and 12B have the crystal plane of {111}. The angle 8 between the incident direction of synchrotron radiation 2 and the surfaces of silicon crystals 12A and 12B is set such that X-ray having a desired wavelength generates Bragg reflection. Thus only the X-ray 2A having a desired wavelength is directed to the sample 1 while its intensity is not lowered as in the case when it is passed through a filter. Therefore, according to the embodiment shown in FIG. 4, the index of refraction can be increased in the region of the silica glass irradiation with light efficiently, while thermal distortion and thermal deterioration of silica glass caused by unnecessary light component can be prevented. In the example of FIG. 4 also, cooling apparatus 13 may be used in order to surely prevent increase in temperature of silica glass 1, as in embodiment of FIG. 3.

Further, a method of adjusting distribution of the change in index of refraction in the depth direction of silica glass in accordance with a still further embodiment of the invention will be described. As can be seen from FIG. 2, X-ray having shorter wavelength is less likely to be absorbed by a substance, and hence it is more likely to be transmitted to a deeper position from the surface of the substance. Therefore, if the wavelength of X-ray is made shorter, the X-ray can reach deeper position of silica glass, and hence change in the index of refraction at a deeper position can be realized. More specifically, by selecting the wavelength of the X-ray, it is possible to adjust distribution of the change in index of refraction in the depth direction of silica glass. More specifically, based on the change in cross sectional area of absorption dependent on the wavelength of X-ray, it is possible to adjust distribution of change of the index of refraction within the range of from several to several 10 μm from the surface of the silica glass.

As a specific example, X-ray irradiation was performed at 265 mA.h through a Be thin film filter having the thickness of 100 μm. At this time, the distance between the light source and the silica glass was 1.3 m. The irradiated silica glass sample was measured by the aforementioned Pulfrich refractometer and Δn was about $4.3\times10^{-3}$. As already described, in this refractometer, the index of refraction at the depth of 1 μm from the surface of silica glass is measured. Therefore, the surface layer of silica glass was removed by grinding in the depth direction and the change in the index of refraction was measured. The amount of change Δn in the index of refraction at the depth of 10 μm was about 70% of the amount of change of the index of refraction at the surface.

Then, X-ray was irradiated at 450 mA.h through a Cu filter having the thickness of 5 μm. The amount of change Δn in the index of refraction at the surface of silica glass was about $1\times10^{-3}$, and the amount of change in the index of refraction at the depth of 10 μm was 85% of the amount of change in the index of refraction at the surface.

More specifically, the wavelength of X-ray passing through the filter of Cu is shorter than that of X-ray passing through the filter of Be. Therefore, the change in the index of refraction is maintained to a deeper position of the silica glass which is irradiated with X-ray through Cu filter.

Figure 5:
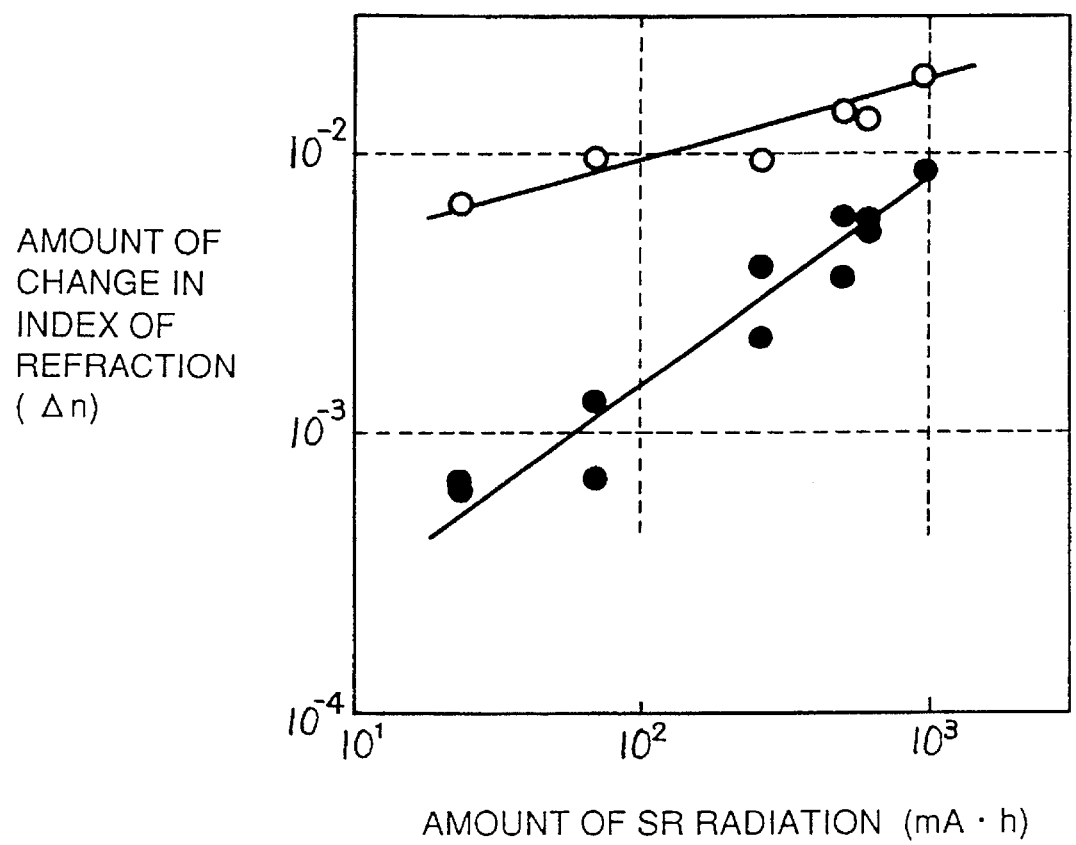
FIG. 5 is a graph showing relation between amount of SR radiation and amount of change in index of refraction of silica glass.

FIG. 5 is a graph showing relation between the amount of change of the index of refraction and the amount of radiation of white synchrotron radiation (SR radiation). More specifically, the abscissa represents the amount of SR radiation (mA.h) and the ordinate represents the amount of change (Δn) in the index of refraction. The mark o represents the change in the index of refraction of silica glass doped with Ge, while the mark ● represents the change in the index of refraction of highly pure silica glass. In the measurement of FIG. 5, the distance between the light source and the silica glass was 1.3 m.

From the graph of FIG. 5, it can be seen that the silica glass doped with Ge has its index of refraction changed at higher efficiency than the highly pure silica glass. Further, both in the silica glass doped with Ge and highly pure silica glass, the amount of change Δn in the index of refraction is in proportion to the nth power (0<n<1) of the amount of SR radiation. Therefore, by utilizing the result of FIG. 5, the amount of SR radiation necessary for obtaining desired amount of change Δn of the index of refraction in silica glass can be set in advance.

Though FIG. 5 shows the result obtained by using white SR radiation, when SR radiation having a specific wavelength is to be used by utilizing a filter or a spectrometer, the amount of SR radiation can be set in advance by correcting it with a factor inherent to the filter or spectrometer.

Though use of X-ray included in SR radiation has been described in the embodiments above, X-ray from an X-ray tube may be used as appropriate.

As described above, according to the present invention, in contrast to the conventional method in which radiation for several ten minutes was necessary to obtain a desired increase in the index of refraction of silica glass, a method of increasing the index of refraction of silica glass which can attain the desired index of refraction in the order of several seconds can be provided. Further, if a large scale synchrotron such as synchrotron Spring-8 which is under development by Institute of Physical and Chemical Research and Japan Atomic Energy Research Institute together is used as the light source of the present invention, the time of irradiation to obtain the desired index of refraction can further be reduced.

Further, according to the present invention, distribution of change of the index of refraction from the surface of the silica glass to the depth direction can be precisely adjusted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of increasing index of refraction of silica glass, comprising the steps of:

preparing a silica glass;

irradiating a prescribed region of said silica glass with X-ray having a wavelength within a range from 1.2 Å to 7.0 Å; and exciting K shell electrons of silicon atoms in said irradiated region by said X-ray, whereby increasing the index of refraction in said irradiated region.

2. The method of increasing index of refraction of silica glass according to claim 1, wherein synchrotron radiation is used as said X-ray.

3. The method of increasing index of refraction of silica glass according to claim 1, wherein a metal film is used as a filter for obtaining the X-ray having said wavelength efficiently.

4. The method of increasing index of refraction of silica glass according to claim 3, wherein said metal film filter is formed of a beryllium film.

5. The method of increasing index of refraction of silica glass according to claim 1, wherein a crystal spectrometer is used for obtaining the X-ray having said wavelength efficiently.

6. The method of increasing index of refraction of silica glass according to claim 5, wherein said crystal spectrometer includes a double crystal spectrometer using two silicon crystals.

7. The method of increasing index of refraction of silica glass according to claim 6, wherein {111} plane of said two silicon crystals is used as a reflection surface.

8. The method of increasing index of refraction of silica glass according to claim 1, further comprising the steps of selecting X-ray having a prescribed wavelength within a range of 1.2 Å to 7.0 Å, and irradiating with the X-ray having said selected wavelength so that distribution of change of said index of refraction is adjusted in a depth direction from a surface of said silica glass.

9. The method of increasing index of refraction of silica glass according to claim 1, wherein said silica glass is cooled while it is irradiated with said X-ray.

10. The method of increasing index of refraction of silica glass according to claim 8, wherein said silica glass is cooled while it is irradiated with said X-ray.

11. The method of increasing index of refraction of silica glass according to claim 1, wherein amount of radiation of said X-ray necessary for a desired amount of change of the index of refraction is found in advance by using a relation that amount of change of said index of refraction is in proportion to nth power (0<n<1) of amount of radiation of said X-ray.

12. The method of increasing index of refraction of silica glass according to claim 8, wherein amount of radiation of said X-ray necessary for a desired amount of change of the index of refraction is found in advance by using a relation that amount of change of said index of refraction is in proportion to nth power (0<n<1) of amount of radiation of said X-ray.

13. The method of increasing index of refraction of silica glass according to claim 8, wherein selection of the X-ray having said prescribed wavelength is performed by selecting metal material of the metal thin film filter.

14. The method of increasing index of refraction of silica glass according to claim 8, wherein selection of the X-ray having said prescribed wavelength is performed by using a crystal spectrometer.

15. The method of increasing index of refraction of silica glass according to claim 8, wherein one selected from a synchrotron radiation apparatus and a tube type X-ray generating apparatus is used as a source of said X-ray.

* * * * *

UNITED STATES PATENT AND TRADEMARK OFFICE
CERTIFICATE OF CORRECTION

PATENT NO. : 5,617,460
DATED : Apr. 1, 1997
INVENTOR(S) : Katayama et al.

It is certified that error appears in the above-indentified patent and that said Letters Patent is hereby corrected as shown below:

Col. 2, line 13, replace "sell" by --shell--.
Col. 5, line 17, replace "filter 1" by --filter 11--;
    line 20, after "light" insert --,--;
    line 21, before "which" insert --and--;
    line 26, after "refraction" (first occurrence) insert --is avoided--.
Col. 6, line 21, (actual line count) replace "An" by --$\Delta$n--.

In the Claims:
Col. 7, line 31, (actual line count), replace "whereby" by --thereby--.
Col. 8, line 7, replace "a" (second occurrence) by --said--;
    line 9, replace "selected" by --prescribed--;
    line 24, (actual line count) after "that" insert --said--;
    line 26, (actual line count) after "of" (first occurrence) insert --said--;
    line 31, (actual line count) after "that" insert --said--;
    line 33, (actual line count) after "of" (first occurrence) insert --said--;
    line 37, (actual line count) after "selecting" insert --a--, replace "the" by --a--.

Signed and Sealed this

Eleventh Day of November, 1997

*Attest:*

BRUCE LEHMAN

*Attesting Officer*   Commissioner of Patents and Trademarks